March 28, 1950 G. W. JESSUP 2,502,092
GEAR TYPE FLUID CLUTCH
Filed Aug. 23, 1945 3 Sheets-Sheet 1
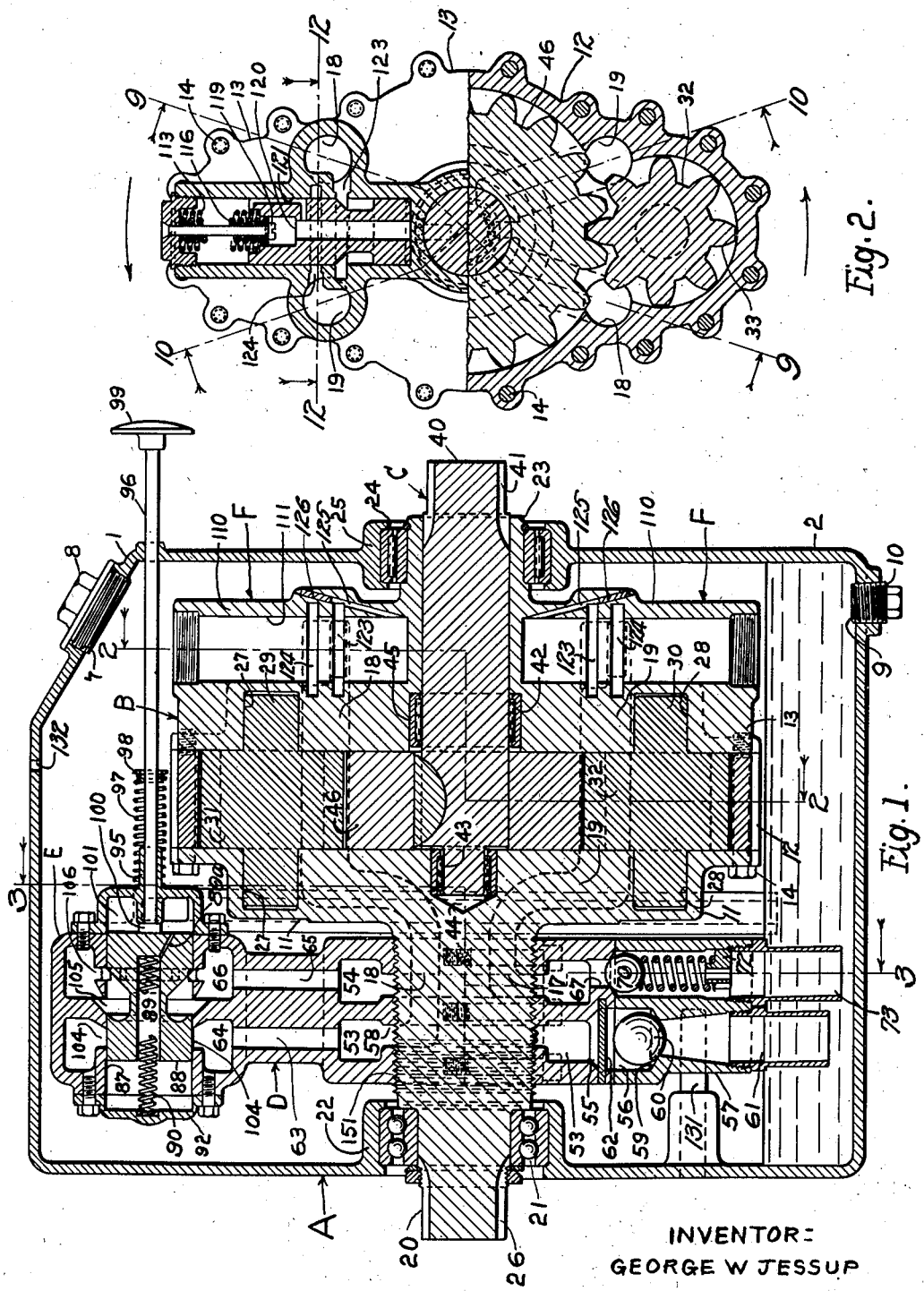
INVENTOR:
GEORGE W JESSUP
BY Dike, Calver & Porter,
ATTYS.

March 28, 1950 G. W. JESSUP 2,502,092
GEAR TYPE FLUID CLUTCH
Filed Aug. 23, 1945 3 Sheets-Sheet 2

INVENTOR:
GEORGE W JESSUP
BY Dike, Calvert + Porter,
ATTYS

March 28, 1950  G. W. JESSUP  2,502,092
GEAR TYPE FLUID CLUTCH
Filed Aug. 23, 1945  3 Sheets-Sheet 3
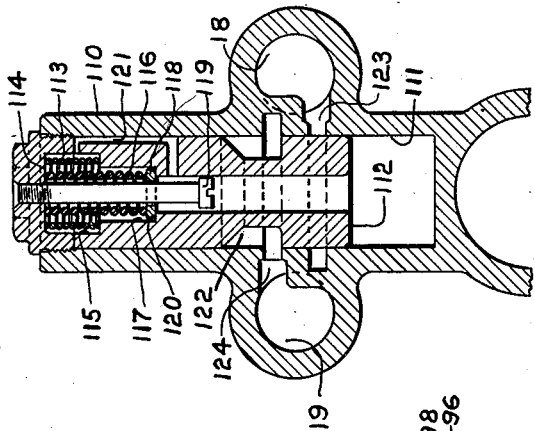
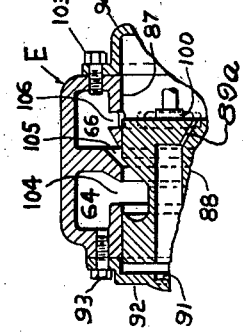
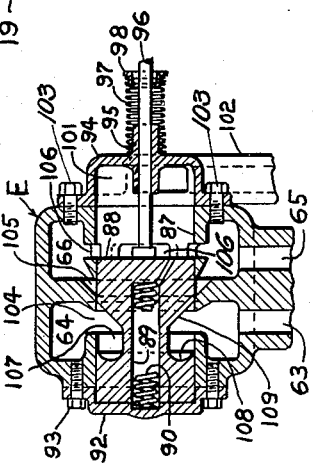
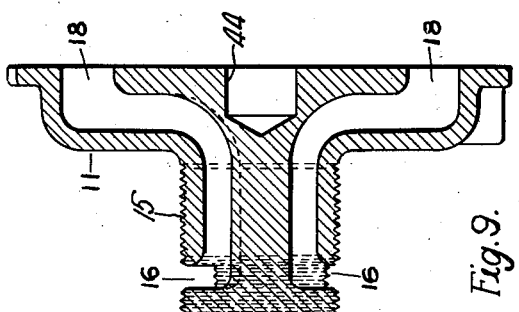
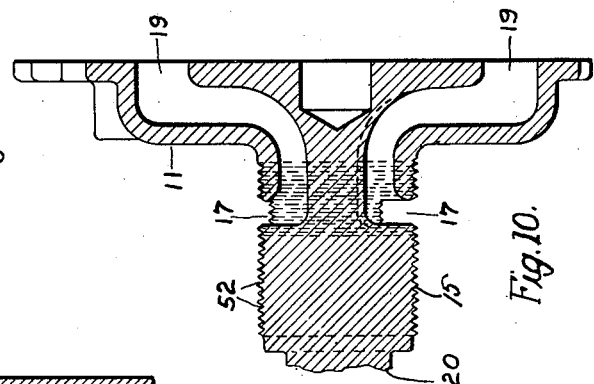
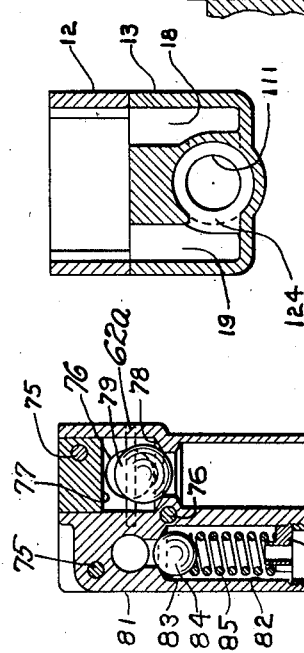
INVENTOR:
GEORGE W JESSUP
BY Dike, Calver + Porter,
ATTYS.

Patented Mar. 28, 1950

2,502,092

UNITED STATES PATENT OFFICE 2,502,092

GEAR TYPE FLUID CLUTCH

George W. Jessup, Waltham, Mass.

Application August 23, 1945, Serial No. 612,234

16 Claims. (Cl. 192—61)

This invention relates to an improvement in clutches, and more particularly to a new type of hydraulic clutch.

The advantages of a fluid driving medium over friction clutches, especially for transmitting power from a motor to the transmission of a vehicle, have long been recognized. The engaging surfaces of friction clutches are apt to wear out more rapidly under present day driving conditions, when frequent stops are necessary because of numerous traffic signals, and high-powered, quick pick-up engines enable the driver to start too quickly. The force necessary to disengage the clutch, in some vehicles, requires a "power booster" or auxiliary mechanism.

The fluid flywheel or "fluid drive" has, however, presented almost equally serious problems. Although it is smoother acting and therefore safer for passengers and easier on the driving mechanism, it has also resulted in poorer performance in other respects. In the first place, there is usually considerable power loss due to slippage, i. e., the fluid slips between the driving and driven parts to such an extent that the full power of the driving member is not transmitted to the driven. This causes more work for the engine, and, consequently, greater consumption of fuel. The fluid is also subject to overheating, which reduces the efficiency of the clutch. Another difficulty is that the fluid acts on the driven members when the gears are meshed and the driving member is rotating at low speeds. This causes what is known as "creeping," the vehicle tending to move unless the brakes are applied.

Since full disengagement at low speeds is not obtained, a friction clutch may have to be provided for use with the fluid fly-wheel in order to effect complete disengagement so that gear changes may be made.

The objects of my invention are to permit the smooth operation characteristic of fluid driven elements and the elimination of wear on moving or engaging parts without the power loss, the over-heating, and the incomplete disengagement which have hitherto limited the usefulness of the fluid drive. It has also the further object of permitting a large degree of automatic adaptation to driving requirements, reducing the need for shifting gears, and making it possible for the vehicle to stand still while in gear, without stalling the engine. Other and subordinate objects will appear hereinafter.

The nature of my invention will be apparent from the following description of an illustrative embodiment thereof shown in the accompanying drawings. The invention is not limited to the exact form shown or in any other way except as defined in the accompanying claims.

In the drawings:

Fig. 1 is a vertical section through the axis of a device embodying the invention, the section being on the line 1—1 as shown in Fig. 3.

Fig. 2 is a vertical section on line 2—2 of Fig. 1.

Fig. 5 is a similar view showing a second operative position.

Fig. 7 is a similar view showing a different operative position of the valve.

Fig. 8 is a fragmentary section showing a third operative position of the valve.

Fig. 9 is a section on line 9—9 of Fig. 2 showing a part of the impeller of the clutch.

Fig. 10 is a view similar to Fig. 9 on line 10—10 of Fig. 2.

Fig. 11 is a section on line 11—11 of Fig. 3.

Fig. 12 is a partial section on line 12—12 of Fig. 2.

Figure 4:
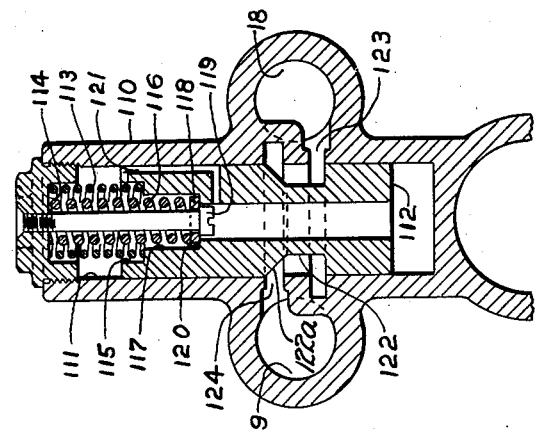
Fig. 4 is a partial section on line 2—2 of Fig. 1 showing the automatic release valve in one operative position.

The clutch of my invention may for convenience in description be considered as comprising a casing A, a driving element or impeller B, a follower or driven element C, a manifold body D, main clutch release valve E and automatic release valves F.

The casing A has an upper section 1 bolted to a lower or reservoir section 2 by bolts 3 and 4, which also secure the casing to brackets or frame elements 5 and 6 which may form a part of an automotive vehicle or the like. A hole 7 for introducing fluids to the casing is provided with a plug or screw cap 8, and a drainage vent 9 is closed with a plug 10. Oil is the fluid preferably used, and is usually maintained at the approximate level indicated in Fig. 1.

The impeller B has a housing comprising three main housing sections 11, 12 and 13 secured together by bolts 14 (see Figs. 1 and 2). The housing section 11 (Fig. 9) has a shaft portion 15 provided with intake ports 16 (Fig. 9) and exhaust vents 17 (Fig. 10). These ports and vents open into intake conduits 18—18 and exhaust conduits 19—19 respectively, which continue through the middle housing section 12, through section 13, and into the automatic valves F. There are two means by which fluid can pass between intake conduits 18 and exhaust conduits 19. These will be explained later. An extension 20 of the housing section 11 comprises a main drive shaft journalled in a main bearing 21 in a hub 22 in the casing A, while an extension 23 of the housing section 13 comprises a tubular shaft journalled in a main bearing 24 held in a hub 25 in the opposite side of casing A (see Fig. 1). The outer ends of the shaft 20 are splined as at 26 or otherwise suitably formed in any well known manner to form a connection with a source of motive power.

The housings 11 and 13 are provided with bearings 27—27 and 28—28 in which are journalled shafts 29 and 30 which carry planet gears 31 and 32. These gears are so placed that their several teeth 33 (see Fig. 2) project into the intake conduits 18—18. It will be understood that more planet gears can be used, in which event changes will be made in the number of conduits and possibly in the number of automatic valves F, but for the purpose of explaining the invention, only one planet gear and automatic valve need be described, as their construction will not differ fundamentally with the number used.

The driven element or follower C comprises a shaft 40 which may be splined or otherwise suitably formed as shown at 41 for connection with whatever mechanism is to be driven. This shaft is journalled in bearings 42 and 43. Bearing 42 is held in a recess 44 in the housing 11, and bearing 43 is held in a recess 45 in housing 13. Keyed on the shaft 40 is a sun gear 46 (see Fig. 2) run by the planet gears 31 and 32 whenever rotation of the planet gears about their respective axes is prevented.

The manifold body D has two housing sections 47 and 48 (Fig. 3) held together by bolts 49 and 50. The parts of the housing sections fit closely about the shaft portion 15 of housing 11, and have machined therein a series of ridges 51 that match grooves 52 machined in the bearing surface of the shaft. These mated grooves and ridges prevent seepage of fluid from the fluid conduits, and also serve to align the manifold, which is stationary. The shaft turns freely in the manifold as in a bearing. Inside the body of the manifold are formed two ring-shaped channels 53 and 54. The channel 53 is an intake channel connected at 55 to the chamber 56 of an intake valve 57 and open at 58 to the intake ports 16—16 of the shaft portion 15. The valve chamber 56 is provided with a valve seat 59 on which rests a ball 60. Extending below the valve seat is an inlet tube 61 that extends below the surface of the fluid in the reservoir 2. The ball 60 is permitted to rise whenever a partial vacuum is created in the chamber and the fluid is sucked up into the tube, but is prevented from rising far enough to close the opening to the ring-shaped channel by a pin or bar 62. Extending upwardly from the channel 53 is a communicating bore 63 adapted to permit passage of fluid between said channel 53 and a ring-shaped chamber 64 formed in the release valve E.

The ring-shaped channel 54 likewise has a communicating bore 65 leading to valve chamber 66. Channel 54 also communicates at 67 with an exhaust valve comprising a chamber 68 (Fig. 3) which has a valve seat 69 against which a ball 70 is pressed by a spring 71 that is held in the chamber by an abutment 72. A tube 73 leads from the valve chamber 68 to the bottom of the reservoir 2. When the ball is depressed from the seat 69 by pressure of fluid from above, the fluid is permitted to return to the reservoir.

Figure 3:
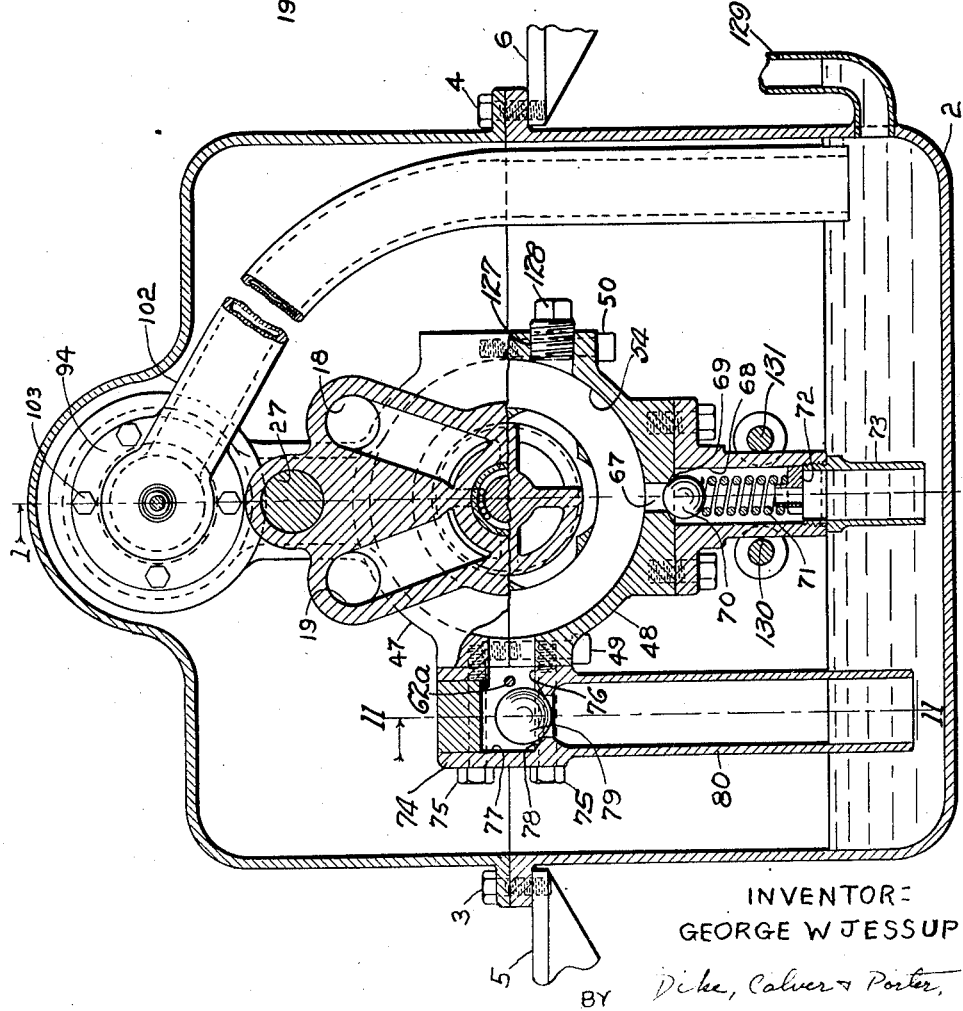
Fig. 3 is a vertical section on line 3—3 of Fig. 1.

Two other valves are connected with the manifold D as shown in Figs. 3 and 11. The valve casing 74 is held to the manifold casing by bolts 75—75. Inside the casing 74 is a connecting port 76 permitting communication between conduits 19—19 and the valve chamber 77 which is provided with a valve seat 78 on which a ball 79 normally rests. A pin 62a prevents the ball from closing the connecting port. A tube 80 extends from the valve chamber into the reservoir 2. A valve casing 81 joined to the valve 74 by any suitable means has a chamber 82 provided with a valve seat 83 against which a ball 84 is pressed by a spring 85 seated on an abutment 72a which is similar to the abutment 72 in valve 68. A tube 86 extends from the chamber 82 into the reservoir 2.

Valve 57 is the intake valve for the intake conduits 18, 18 through the ports 16 leading to channel 53. Valve 74 is an auxiliary or emergency intake for the exhaust conduits 19—19 through ports 17 leading to channel 54. It operates if the action of the clutch is reversed, as when a vehicle is driving the motor, to prevent drawing in air. Both exhaust valves open if the clutch is overloaded.

Valve 68 is an exhaust valve for conduits 19—19 under normal operation, and valve 81 is an exhaust for conduits 18—18 when the clutch operates in reverse.

The valve body E (Figs. 1, 6, 7 and 8) has a cylinder 87 in which is placed a piston 88. Piston 88 is provided with a central bore 89 from which extends a spring 90 seated at its opposite end in a recess 91 formed in a cap 92 held to the end of the cylinder walls by screw bolts 93—93. At the opposite end of the cylinder 87 there is a cap 94 provided with a sleeve 95 adapted to hold a plunger-rod 96. A spring 97 has one end thereof resting on the sleeve 95 and the other end held by a pin 98 passing through the rod 96. The spring normally urges the rod to the right as shown in Fig. 1. The outer end of the rod may have a pedal 99 provided for manual operation. On the inner end of the rod there is a pusher-head 100 (Fig. 8) which prevents removal of the rod. The space 101 provided at the plunger-end of the cylinder by the shape of the cap 94 communicates with a tube 102 (Fig. 3) which extends to a point near the bottom of the reservoir. The cap 94 is secured to the valve body by bolts 103. An extension 89a of the bore 89 (Fig. 8) permits fluid to pass between the forward part of cylinder 87 and the space 101, permitting reciprocal movement of the piston in the cylinder, though the construction provides somewhat the effect of a dash-pot.

The ring-shaped channels 64 and 66 are not in communication except through the cylinder 87 in which the piston 88 is placed. As shown in Fig. 1, channel 64 communicates with the cylinder at 104. Channel 66 has a series of vents 106 (Fig. 7) which communicate with the cylinder, and a ring-shaped opening 105 leading to the cylinder at an angle designed to cause oil passing therethrough to be thrown sharply to the left. The piston 88 has a ring-shaped groove 107 cut around it having a curved forward wall 108 and a sloping rear wall 109 (Fig. 7).

The angle of the ring-shaped opening 105 with the cylinder directs the flow of oil past the sloping wall 109 of the piston and against the cupped wall 108. The force of the oil against wall 108 tends to offset or counterbalance spring 90 whenever the flow is sufficiently great.

When the piston 88 is in the position shown in Fig. 1, where it is at the extreme right of the cylinder, communication between the channels 66 and 64 is prevented, and likewise between channel 66 and the space 101 formed by the cap 94. This is the closed position of the valve.

Figure 6:
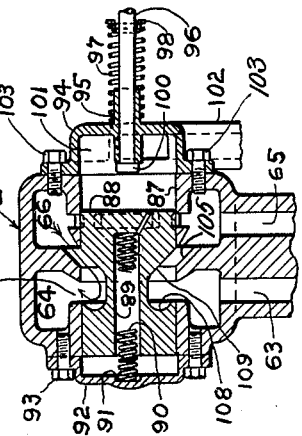
Fig. 6 is a partial section on line 1—1 of Fig. 3 showing the clutch release valve in one operative position.

In Fig. 7, the piston has been pushed to the extreme left by the operator. This movement allows vents 106 to pass fluid from channel 66 to the space 101 behind the piston. Any fluid passed through the exhaust conduits 19—19 will be returned to the reservoir. In Fig. 8, the spring 90 has moved the piston to the right a short distance, allowing fluid to pass from channel 66 to channel 64 by way of the groove 107 in the piston. The vents 106 are not yet closed, so that some of the flow is still diverted to the reservoir. The angle of the opening 105 and the shape of the groove 107, as shown at 108 and 109, are such as to cause the fluid in passing to resist movement of the piston acting under the force of spring 90. The piston does not stay in this position; the drawing merely shows how, when the piston is on its return movement, it passes through a location in which both ports 105 and 106 are passing oil to the cylinder, so that the closing of ports 106 and the opening of 105 does not cause an abrupt transition. In Fig. 6, the spring 90 has moved the piston against the increasing resistance of the oil far enough to open fully the openings 105 and close the vents 106. Whether the piston actually stops in this position or continues to the position of Fig. 1 depends on the amount of force exerted by the oil.

The construction of the automatic release valves F is shown in Figs. 2, 4 and 5. The casings 110—110 may be secured to the casing 13, or form an integral part thereof as shown. Each casing has a cylinder 111 provided with a piston 112 which is normally held in advanced position as shown in Fig. 2 by a relatively weak spring 113 seated in a recess 114 on the head of the cylinder and recess 115 in the piston. A second and stronger spring 116 seated in the recess 114 is adapted to pass freely in the small bore 117 in the head of the piston and is held in place by a washer 118 on a rod 119. The spring is compressed when the washer strikes the shoulder 120 in the bore 117. A relief passage 121 is provided for the purpose of allowing oil to pass from one side of the piston to the other, thus permitting movement of the piston. The head of the piston is provided with an annular groove 122 adapted to provide communication between a bore 123 leading from conduit 18 and bore 124 leading from conduit 19. The wall 122a of the piston is angled to direct oil downwardly against the opposite side of groove 122, so that oil passing through under pressure will tend to oppose an outward closing movement of the piston under centrifugal force. An emergency pressure-relief vent 125 stopped with a plug 126 is provided for the cylinder to relieve undue pressure from seepage.

It is sometimes desirable to employ hydraulic power, particularly for use in some part of the vehicle, such, for example, as when a truck is equipped with hydraulic mechanism for raising a dump body, or a tractor of the so-called "bulldozer" type has an hydraulically operated pusher, plow, or scraper. If the clutch of the invention is used in such vehicles, it is possible to utilize excess flow developed in the clutch to drive outside hydraulic mechanism. For this reason I have provided a bore 127 (Fig. 3) in the casing section 48 of the manifold body D communicating with ring-shaped channel 54 and adapted to transmit fluid pressures from exhaust conduits 19—19. This bore is normally closed with a plug 128. Whenever it is desired, the clutch may be used in connection with outside mechanism (not shown) as aforesaid by connecting an intake line to the bore 127 and a return line to the return pipe 129 in the bottom of the reservoir 2. When such connections are made, the clutch will, of course, perform its usual function in the vehicle, and the engine of the vehicle may be speeded up to provide an excess flow in the fluid system which can be utilized outside the clutch.

Various means may be used to prevent the manifold body D from turning. The pins 130 and 131 (Figs. 1 and 3) extending from the wall of the casing 2 are considered suitable.

It is also desirable to provide an air-vent somewhere in the top of the casing to ensure atmospheric pressure on the oil in the reservoir. A vent 132 is provided for this purpose.

In the operation of the clutch of the invention, the driver of the vehicle pushes on clutch pedal 99 to throw the piston 88 of valve E to the extreme left as shown in Fig. 7 before he starts the motor. When the motor starts, the driving housing or impeller B is rotated counter-clockwise in Fig. 2, carrying the planet gears 31 and 32 around the sun gear. The stationary sun gear 46 meshes with the planet gears and causes them to rotate on their axes. Planet gear 32 in Fig. 2 will then be rotating counter-clockwise. The system is already full of fluid, such as oil, unless the clutch has never been used and has to be primed. In order to prime the clutch, the operator holds the pedal 99 in, in which case the oil is drawn through the system and some of it passed back to the reservoir through tube 102, leaving the system full. This oil fills all of the spaces around the gears, and rotation of the planet gears causes the oil to flow around the planet gears from intake conduits to exhaust conduits. The circulation of oil set up at this time is as follows: oil is drawn into the intake valve 57, through ring channel 53, intake conduits 18—18, between the teeth of the planet gears 31 and 32, through exhaust conduits 19—19, through ring channel 54, through bore 65, to ring channel 66 and out of vents 106 to the return pipe 102 and back to the reservoir. During this time the planet gears may turn freely, so that no movement is given the sun gear.

When the operator wishes to start the vehicle moving, he lets the clutch in by releasing the pedal 99. The rod 96 is immediately returned to the right in Fig. 1 by spring 97 as rapidly as pressure on the pedal is removed, and the pusher head 100 leaves the surface of piston 88 and returns to contact sleeve 95. The spring 90 thereupon begins to move piston 88 to the right in Fig. 1. If the operator lets in the clutch pedal gradually and does not race the motor, the piston will return gradually without stopping to the closed position. It will not return quickly, because the flow of oil directed against the cupped wall 108 will offset the pressure of the spring somewhat. This retarding is done evenly and without a jerk because the stream of oil is gradually diverted to the passage 105 as shown in Fig. 8, where some of the oil is still passing back to the reservoir through vents 106, and a small but increasing part is passing through passage 105. Thus the back pressure acting against the spring 90 is applied gradually until, as shown in Fig. 6, the ports 106 are fully closed and the passage 105 fully open. The pressure exerted at this time will depend on how much the engine is accelerated. If the acceleration is reasonable for starting the vehicle, the spring 90 is capable of overcoming the pressure of the oil and so continues to move the piston to the closed position. The strength of the spring is such as to overcome resistance by the oil at normal starting speeds, but will become balanced when the engine speed is excessive.

When the spring has returned the piston to the position shown in Fig. 1, the valve is closed and the oil cannot circulate through the system. This stopping of circulation prevents the planet gears from turning on their axes. Instead of the sun gear driving the planet gears, the impeller housing acting through the fixed planet gears now rotates the sun gear. It will not do this suddenly because, as already pointed out, the flow of oil is shut off gradually and consequently, the planet gears turn on their axes less and less easily. The increasing resistance to rotative movement is such that they begin turning the sun gear before their own axial movement is wholly prevented. This gives the vehicle a very smooth, even start.

If the operator accelerates the engine excessively when he lets the clutch in, he automatically prevents the vehicle from jumping ahead. As before described, the spring 90 will move the piston to the right until the flow of oil begins through passage 105 as shown in Fig. 8 whereupon the pressure of the oil against the wall 108 gradually slows the return movement of the piston and finally stops it in approximately the position shown in Fig. 6. This is because the engine is turning the impeller housing at a high speed and the stationary or slowly moving sun gear is turning the planet gears at a high rate of speed, thus forcing a large volume of oil or causing a high rate of flow through the system. The pressure of this flow on the piston 88 is amply sufficient to counterbalance spring 90 (Fig. 6). As long as oil can pass from chamber 66 to chamber 64 by way of the groove 107 in the piston, the planet gears do not become locked. Their rotation is somewhat impeded, however, because the size of the oil passages then operating in the valve E and the strength of the spring are such as to slow the flow of oil from ring chamber 66 to ring chamber 64 through groove 107 sufficiently to permit the planet gears to have some effect on the sun gear. This is usually enough to move the vehicle in low gear. As soon as the engine speed is reduced, or the sun gear given time and opportunity to pick up speed, the planet gears will revolve more slowly and the pressure of oil on the piston will be reduced, finally allowing the spring 90 to force the piston into its closed position. Consequently, the operation of valve E as stated above is such as to cause the sun gear to pick up speed gradually, even when the clutch pedal is let in quickly or when there is undue acceleration of the engine. In both events, axial rotation of the planet gears prevents the sun gear from being driven as fast as the degree of acceleration would otherwise require. The degree of acceleration must be reduced, or the sun gear given an opportunity to attain speed. In this manner the clutch is prevented from becoming fully engaged as long as there is any excessive differential between the speed of the impeller and the speed of the driven gear.

When finally the valve is fully closed the planet gears become locked against axial rotation and the impeller drives the sun gear, which in turn drives the shaft 40 connected to a transmission or other driven mechanism. During this phase of operation the clutch is "thrown in" and the engine drives the vehicle without any appreciable slippage, so there is no loss of power. Overheating is prevented, as the oil is not churned as in a fluid flywheel.

When the operator wishes to change gears or to stop the car, he again pushes on the pedal 99, which opens the valve E and permits circulation of oil. This circulation allows the planet gears to turn freely on their axes and cease turning the sun gear 46.

When the planet gears are permitted to turn freely, there is no appreciable drag on the sun gear, thus eliminating creeping of the vehicle due to drag, and permitting the transmission gears to be easily shifted without the addition of a friction clutch.

If the vehicle is brought to a stop while in gear, or if the engine is allowed to idle for any reason, and the operator does not depress the pedal 99, then the automatic valves operate to relieve the planet gears and allow them to cease turning the sun gear.

In Fig. 2 an automatic valve is shown fully closed. It is normally in this position when the engine is not running. Whenever the engine turns at about 60 to 100 R. P. M., the centrifugal force derived from the rotating impeller or casing B is sufficient to overcome the weak spring 113 and raise the piston to the position shown in Fig. 4 where further movement is resisted by the strong spring. This permits oil to pass from the exhaust conduit 19 back to the intake conduit 18. The circulation of oil is from conduits 18—18 to the planet gears, around the turning gears to the exhaust conduit 19, through the bore 124 to the groove 122 in piston 112 and thence to bore 123 and intake conduit 18, whereupon the circulation repeats. This allows the driver to stop at a light without changing gears and leave the motor idling while the vehicle is standing still. Since the planet gears are free to turn, there is no "creeping" of the vehicle. This position is maintained from about 60 R. P. M. to 350 or 400 R. P. M., which may be considered usual idling speeds. While the strengths of these two springs may be varied somewhat, it is understood that the weak spring should permit the piston to move whenever the engine is idling, while the strong spring should permit the piston to move outwardly above usual idling speeds and force it back under usual idling speeds.

When the driver wishes to start, and accelerates the engine over 400 R. P. M. (approximately) the centrifugal force of the revolving drive casing B is sufficient to force the piston 112 outward against the resistance of spring 116 and the force of the oil directed by sloping shoulder 122a against the opposite wall of the groove 122, thereby closing the automatic valves F and causing the oil, for lack of circulation, to lock the planet gears. The impeller thereupon turns the sun gear to drive the vehicle. If the engine speed is now reduced to any of the usual idling speeds, the decreased centrifugal force permits the valves to open before the engine stalls. At this time the opposing forces are only those of centrifugal pressure and the pressure of the spring, as there is no pressure of oil in the groove 122. Consequently, the valve will open more readily than it will close.

In view of the operation of valves E and F, the clutch is both manually controlled and fully automatic during operation.

The lowermost or inward position of the piston, during which the valve is closed, is only necessary to enable the vehicle to drive the engine, as when it is being pushed. If it were not for this possibility, the piston would need only one closing position.

Whenever too much pressure is developed in the system, release of oil from conduits 19—19 to the reservoir can be had automatically through pressure release valve 66. If too much pressure is developed in the automatic valves F, release can be had through emergency vents 125.

If the vehicle is being pushed, or the engine back-fires thus reversing the direction of flow of the oil in the system, the valves 74 and 81 come automatically into operation. The exhaust conduits 19—19 now act as intake conduits, and may receive oil from the reservoir through valve 74. If too much pressure develops, oil is discharged through pressure release valve 81. These valves do not function except when the clutch is turning in reverse.

More than two planet gears may be used, although two are amply sufficient and serve to balance the structure. If the impeller is otherwise balanced, one automatic valve may be used for more than one planet gear by providing suitable conduits leading to the main conduits that pass oil to and from the gears.

I claim:

1. In a fluid clutch having a planetary system of gears and fluid conduits for passing a fluid to and from the gears, in combination, a valve body having a cylinder formed therein, a piston reciprocable in said cylinder, two separate passages in said valve body, one of said passages being connected with the conduit leading to and the other being connected with the conduit leading from said planetary system, ports in said passages communicating with said cylinder, means associated with said piston adapted to permit passage of fluid from one of said passages to the other only in certain operative positions of the piston, means for moving said piston into a position for permitting communication between the separate passages, automatic means for returning the piston to a position preventing flow of fluids, and means for directing the flow of said fluid to cause it to retard the movement of said piston toward closed position.

2. In a fluid clutch having a reservoir for fluids and intake and exhaust conduits for the passage of fluid, in combination, a valve body, having a cylinder formed therein, a channel within said valve body communicating with the intake conduit and the cylinder, a second channel communicating with the exhaust conduit and the cylinder, a piston reciprocable in the cylinder, a groove in the piston adapted to permit the flow of fluid from one of said channels to the other in certain operative positions of the piston, said groove having a cup-shaped portion on one side thereof adapted to receive fluid pressure tending to move the piston in one direction, and means normally tending to move the piston in the opposite direction against the fluid pressure.

3. In the clutch defined in claim 2, in combination, an angular passage leading from said second channel adapted to direct the flow of fluid against the cup-shaped portion of the groove in the piston.

4. In a fluid clutch having conduits for the passage of fluid in combination, a valve body having a cylinder therein, a piston reciprocable in said cylinder, and a groove in said piston adapted to pass fluid from one part of the valve body to another only in predetermined operative positions of the piston, said groove having a substantially concave portion and an inclined portion leading from the surface of the piston to said concave portion to direct the flow of fluid against the concave portion.

5. In a fluid clutch having a rotatable housing with a planetary system of gears, an inlet conduit for passing a fluid to the gears and an outlet conduit for passing fluid from the gears, in combination, an automatic valve in fluid communication with each planet gear having a valve body secured to the housing, a cylinder in the valve body, a piston in the cylinder, a port in said body permitting passage of fluid from the inlet conduit to the cylinder, a second port connecting said cylinder with the outlet conduit, a groove in the piston permitting communication between said ports in one operative position of the piston, means adapted to prevent movement of the piston except under a predetermined centrifugal force exerted on it by the rotation of the housing, and a second means adapted to prevent further movement of the piston except under a greater predetermined centrifugal force, the piston when under the influence of the first means in the absence of substantial centrifugal force serving to prevent communication from one conduit to the other, the position of the piston when advanced by centrifugal force acting against the first means serving to permit communication, and the extreme advanced position of the piston under increased centrifugal force acting against the second means serving to close the ports again to prevent flow.

6. In a fluid clutch having a rotatable housing having therein a planetary system comprising planet gears and a sun gear, and conduits for passing fluid to and from said gears, in combination, an automatic valve comprising a valve body, a cylinder formed therein, a piston in the cylinder adapted to move in one direction under the influence of centrifugal force derived from the rotatable housing, conduits permitting the passage of fluid between the cylinder and the first named conduits, a groove in the piston permitting communication between said second named conduits in certain operative positions of the piston, means for resisting movement of the piston until a predetermined degree of centrifugal force is created, and means adapted to resist further movement of the piston until a substantially greater degree of centrifugal force is exerted, the position of the piston after the first resistance is overcome and before the second resistance is overcome being such as to align the groove and the second named conduits to permit the passage of fluid through the cylinder.

7. In the clutch defined in claim 5, in combination, a slanting shoulder formed in the groove of the piston adapted to direct the flow of fluid against the opposite wall of the groove to cause said flow to resist outward movement of the piston under centrifugal force.

8. In a fluid clutch having a rotatable housing with a planetary system of gears, an inlet conduit for passing a fluid to the gears and an outlet conduit for passing fluid from the gears, in combination, an automatic valve for the planet gears having a valve body secured to the housing, a cylinder in the valve body, a piston in the cylinder, a port in said body permitting passage of fluid from the inlet conduit to the cylinder, a second port connecting said cylinder with the outlet conduit, a groove in the piston permitting communication between said ports in one operative position of the piston, a relatively weak spring adapted to prevent movement of the piston except under a predetermined centrifugal force exerted on it by the rotation of the housing, and a second stronger spring adapted to prevent further movement of the piston except under a greater predetermined centrifugal force, the piston when under the influence of the first spring in the absence of centrifugal force serving to prevent communication from one conduit to the other, the position of the piston when advanced by centrifugal force against the weak spring serving to permit communication, and the extreme advanced position of the piston under increased centrifugal force acting against the stronger spring and the pressure of the fluid against the piston to close the ports again to prevent flow.

9. A fluid clutch comprising, in combination, a rotatable housing adapted to receive power from a suitable source, a plurality of planet gears journalled in the housing, a sun gear journalled in the housing, a reservoir for fluid, conduits for each planet gear adapted to pass fluid to and from the planet gear and sun gear, a manually operable valve for preventing the flow of fluid through the conduits to lock the planet gears with the sun gear, an intake and a pressure release valve for each of said conduits, and an automatic valve having a piston directly responsive to centrifugal force derived from the housing connected with said conduits, said automatic valve being adapted to permit the passage of fluid to and from the planet gears whenever the manually operable valve is closed and the source of power is run at idling speeds, said automatic valve serving thereby to release the planet gear for rotation.

10. A fluid clutch comprising, in combination, a casing, a reservoir in the bottom of the casing, a rotatable housing journalled in the casing, planet gears journalled in the housing, a shaft journalled in the housing, a sun gear fixed on the shaft meshing with the planet gears, an intake conduit for conducting fluid from the reservoir to the gears, a manually operable valve, an exhaust conduit for conducting fluid from the gears to the valve, a conduit for conducting fluid from the valve to the intake conduit, manually operable means for opening the valve to permit flow, means for closing the valve automatically to prevent flow, an automatic valve for each planet gear adapted to open to permit flow of fluid through the gears in response to centrifugal force derived from the rotatable housing when turning at idling speeds and adapted to close to prevent flow in response to a greater centrifugal force whenever the housing is rotated at greater than idling speeds.

11. In a fluid clutch having a rotatable housing, a planetary gear system within the housing comprising a sun gear and a planet gear, means for conducting a fluid to the teeth of said planet gear, means for conducting the fluid from said teeth, and means for stopping the flow of fluid from the teeth of the planet gear to prevent the planet gear from rotating on its axis, in combination, a main control valve having a cylinder, a piston in the cylinder, manually operated means for moving the piston in only one direction, automatic pressure means for moving the piston in the opposite direction, and means for directing the force of fluid pressure on said piston to urge it against the force applied by said automatic means.

12. In a fluid clutch having a rotatable housing, a planetary gear system within the housing comprising a sun gear and a planet gear, means for conducting a fluid to the teeth of said planet gear, means for conducting the fluid from said teeth, and means for stopping the flow of fluid from the teeth of the planet gear to prevent the planet gear from rotating on its axis, in combination, a main control valve having a cylinder, a floating piston balanced as to oil pressure in the cylinder, manually operated means for moving the piston in one direction, automatic pressure means for moving the piston in the opposite direction, and means for directing the force of fluid pressure on said piston to urge it against the force applied by said automatic means.

13. In a fluid clutch having a rotatable housing, a planetary gear system within the housing comprising a sun gear and a planet gear, means for conducting the fluid to the teeth of said planet gear, means for conducting the fluid from said teeth of the planet gear to prevent the planet gear from rotating on its axis, in combination, a main control valve having a cylinder, a piston in the cylinder, manually operated means movable against but not secured to said piston for moving the piston in only one direction, automatic pressure means for moving the piston in the opposite direction, and means for directing the force of fluid pressure on said piston to urge it against the force applied by said automatic means.

14. In a fluid clutch having a rotatable housing, a planetary gear system within the housing comprising a sun gear and a planet gear, means for conducting a fluid to the teeth of said planet gear, means for conducting the fluid from said teeth, and means for stopping the flow of fluid from the teeth of the planet gear to prevent the planet gear from rotating on its axis, in combination, a main control valve having a cylinder, a piston in the cylinder, manually operated means for moving the piston in one direction, automatic pressure means for moving the piston in the opposite direction, and cooperating means on said cylinder and said piston for directing the flow of fluid to retard its movement in one direction.

15. In a fluid clutch having a rotatable housing, a planetary gear system within the housing comprising a sun gear and a planet gear, means for conducting a fluid to the teeth of said planet gear, means for conducting the fluid from said teeth, and means for stopping the flow of fluid from the teeth of the planet gear to prevent the planet gear from rotating on its axis, in combination, a double-acting centrifugally operated automatic valve having one closed position in which said flow is stopped, an open position in which flow is permitted, and a second closed position in which flow is stopped, said open position being intermediate said closed positions.

16. In an automatic release valve for fluid clutches with a planetary system of gears through which fluid passes from an intake to an exhaust circuit, in combination, an intake port adapted to communicate with the exhaust circuit of said gears, an exhaust port adapted to communicate with the intake circuit of said gears, a spring loaded piston which at rest prevents communication between said ports and which under the impulse of centrifugal force acting against said spring is adapted to pass progressively to an intermediate position permitting communication between said ports and to an extreme position in which communication is again prevented.

GEORGE W. JESSUP.

REFERENCES CITED

The following references are of record in the file of this patent:

UNITED STATES PATENTS

| Number | Name | Date |
|---|---|---|
| 1,037,243 | Guy | Sept. 3, 1912 |
| 1,132,746 | Sundh | Mar. 23, 1915 |
| 1,688,852 | Christie | Oct. 23, 1928 |
| 1,748,436 | Arkin | Feb. 25, 1930 |
| 1,828,861 | DeHart | Oct. 27, 1931 |
| 1,883,685 | Gasterstadt | Oct. 18, 1932 |
| 1,999,248 | Melling | Apr. 30, 1935 |
| 2,145,894 | Rusch | Feb. 7, 1939 |
| 2,318,028 | Thomas | May 4, 1943 |
| 2,377,350 | Marsh | June 5, 1945 |
| 2,382,114 | Stephens | Aug. 14, 1945 |
| 2,418,625 | Cornelius | Apr. 8, 1947 |